United States Patent [19]

Mathusima et al.

[11] 4,237,668
[45] Dec. 9, 1980

[54] HEAT INSULATING STRUCTURE FOR USE IN TRANSPORTING AND HANDLING GAS OF HIGH TEMPERATURE AND PRESSURE

[75] Inventors: Tokunori Mathusima, Ibaraki; Takeshi Sato, Hitachi; Akira Uenishi, Mito, all of Japan

[73] Assignee: Hitachi, Ltd., Tokyo, Japan

[21] Appl. No.: 932,328

[22] Filed: Aug. 9, 1978

[51] Int. Cl.³ .......................... F16L 9/14; F16L 9/18; F16L 59/12; F16L 59/14
[52] U.S. Cl. .................. 52/249; 52/223 R; 52/268; 52/404; 138/113; 138/114; 138/149; 428/36; 428/114
[58] Field of Search ............ 52/249, 268, 223 R, 52/404, 809; 138/149, 113, 114; 428/36, 105, 113, 114

[56] References Cited

U.S. PATENT DOCUMENTS

| | | | |
|---|---|---|---|
| 2,423,213 | 7/1947 | Weber | 138/149 X |
| 2,707,493 | 5/1955 | Bonvillian et al. | 138/149 X |
| 3,280,849 | 10/1966 | Rendos et al. | 138/149 |
| 3,453,718 | 7/1969 | Bates | 138/149 X |
| 3,810,491 | 5/1974 | Hildebrandt | 138/149 |
| 3,865,145 | 2/1975 | McKay et al. | 138/149 X |
| 4,014,369 | 3/1977 | Kobres, Jr. | 138/149 X |
| 4,061,162 | 12/1977 | Jones et al. | 138/149 X |

*Primary Examiner*—Stephen J. Novosad
*Attorney, Agent, or Firm*—Thomas E. Beall, Jr.

[57] ABSTRACT

A heat insulating structure having a heat-resistant tube disposed in a tubular cylindrical body and defining a passage for a high temperature gas, a heat insulating material disposed between the tube and the tubular cylindrical body and adapted to prevent the heat possessed by the gas from being transmitted to the tubular cylindrical body, and a spring adapted to bias the heat insulating material toward the inner surface of the tubular cylindrical body, so as to prevent the formation of a bypass passage for the gas including the gap between the tubular cylindrical body and the heat insulating material. The heat insulating material consists of a plurality of fibrous heat insulating materials mainly consisting of bulky fibrous materials and a plurality of shaped fibrous heat insulating materials. These fibrous heat insulating materials and the shaped fibrous heat insulating materials are arranged alternatingly and independently in the axial direction. In each of the bulky fibrous heat insulating material, disposed is a spring for biasing the shaped fibrous heat insulating material in the axial direction.

11 Claims, 6 Drawing Figures

HEAT INSULATING STRUCTURE FOR USE IN TRANSPORTING AND HANDLING GAS OF HIGH TEMPERATURE AND PRESSURE

BACKGROUND OF THE INVENTION

The present invention relates to a heat insulating structure adapted for use in connection with the transportation of a gas having a high temperature and pressure and, more particularly, to a heat insulating structure suitable for use in double-pipe construction for transporting high temperature and pressure gas.

Conventionally, the transportation of high temperature and pressure gases such as, for example, working gas in chemical or power plant has been made by means of a pipe which is made of a material capable of withstanding the high temperature and pressure of the gas. This pipe is usually lagged with a heat insulating material so as to prevent the heat of gas from leaking outside.

On the other hand, the current tendency of diversification of energy utilization and improvement of the efficiency in these chemical and power plants require a high temperature of the working gas well reaching 1000° C., which can hardly be withstood by conventional piping material especially under the presence of the high pressure of the gas. Under this circumstance, it is becoming popular to use double-pipe construction having internal heat insulating material, for transporting such a high temperature and pressure gas.

This double-pipe construction is therefore required to compensate for the reduction of mechanical strength of the pipe attributable to the temperature rise of the piping material, while fulfilling the ordinary purposes of sealing of the gas and preservation of the heat. Consequently, the performance of the heat insulating material or the heat insulating structure, as a factor in designing the construction of the pipes for transporting high temperature and gas pressure, is becoming more critical.

Most of conventionally used heat insulating materials are materials of a type so called lagging, which are adapted to be used under atmospheric pressure. In usual cases, the required heat insulating effect can be obtained by merely attaching the heat insulating material of this kind having a suitable thickness to the portion where the heat insulation is to be made. Therefore, the value of the thermal conductivity can be represented relatively easily, as a function of the mean temperature of the heat insulating material.

In good contrast to the above, in case that the heat insulating material is used in a high temperature and pressure gas such as helium having a thermal characteristic quite different from that of air, the thermal conductivity of the heat insulating material is represented as a function of various factors such as temperature, and the pressure of the gas, radiation factor, Prandtl number, Dhassi number, Rayleigh number, density of the filling of the heat insulating material and so forth. Thus, the heat insulating material exhibits extremely complexed characteristics when used in the high temperature and pressure gas.

Further, when a conventional porous heat insulating material is used in combination with the double-pipe construction for high-temperature use, the heat insulating material is soon deformed due to the sliding movement of the surface of the heat insulating material in relation to the inner surface of the pipe.

In addition, the restorability of the heat insulating material is gradually deteriorated, due to continuous operation for many hours under the presence of high temperature and pressure, and due to a repeated or cyclic change of the temperature and pressure. Consequently, gaps or vacant spaces of gradually increasing volume are formed here and there in the heat insulating structure. All of these phenomena lead to an increment of the thermal conductivity, i.e. the deterioration of the heat insulating performance.

A typical double-pipe of the kind described has a construction as stated below.

Namely, the double pipe has an outer pipe, an inner pipe disposed in the outer pipe and spaced from the latter by means of spacers, sealed pipes adapted to circulate a pressurized cooling gas of low temperature through the annular space formed between the outer and inner pipes, a dummy pipe made of a heat-resistance metallic material and disposed in the inner pipe so as to define a passage of the working gas to be transported, and heat insulating structures disposed between the dummy pipe and the inner pipe, adapted to reduce the amount of heat exchange between the working gas under transportation and the cooling gas and to reduce the temperature differential across the wall of the inner pipe.

This heat insulating structure consists of a fibrous heat insulating material and a hard felt-like shaped fibrous heat insulating material for preventing a part of the heat insulating material from being carried away by the working gas. A plurality of heat insulating structures are disposed alternatingly and independently in the axial direction. The arrangement is such that the thermal expansion of the heat insulating structure in the axial direction is conveniently absorbed by the gaps or vacant spaces preserved between the adjacent structures.

This heat insulating structure consists of two layers separated by an intermediate partition pipe having annular slits for the substitution of the gases within the heat insulating structure. The intermediate partition pipe disposed along the inner layer of the heat insulating structure is spaced by spacers from the dummy tube, so as to preserve a predetermined gas therebetween. The dummy tube is provided with a plurality of slide joints disposed in the axial direction thereof, so as to absorb the thermal expansion in the axial direction.

The conventional heat insulating structure for double pipe as described above, however, exhibits a large deformation and allows the formation of various forms of gaps, due to the sliding movement of the high temperature gas sealing pipe, intermediate partition pipe and the fibrous heat insulating material, in relation to one aother, attributable to the difference of the coefficients of the thermal expansion. Further, the restorability of the heat insulating material is gradually deteriorated, as it is subjected to the high temperature and pressure gas for many hours and to abrupt changes of pressure and temperature due to the repeated start and stop of the plant, as well as repeated change of load. Consequently, the size of the gap or vacancy is gradually increased as the time elapses, so as to deteriorate the heat insulating performance.

Particularly, when the gaps or vacancies are formed to extend in the radial direction, the gas under transportation inconveniently invades these gaps or vacancies through the clearances in the slide joints and slits and then flows through the axial gaps. Thus, the radial gaps or vacancies and the axial gaps in combination form so-called by-pass passages of the gas.

The increase of the apparent thermal conductivity of the heat insulating structure, i.e. the deterioration of the heat insulating performance of the double pipe attributable to these gaps or vacancies is much larger than that caused by natural convections in the heat insulating materials and in the gaps, so that it becomes necessary to design the outer and inner pipes to have larger inner diameters. Further, the deterioration of the heat insulating performance requires an increased flow rate of the cooling gas and, in addition, makes the temperature differential across the wall of the inner tube larger, resulting in an increased thermal stress and, accordingly, deteriorated reliability of the piping as a whole.

Further, since the heat insulating materials are not fixed, they can easily be displaced in the longitudinal direction. Therefore, in case of an earthquake or when a vibration is imparted to the pipes, the heat insulating materials tend to be moved in the longitudinal direction to make the axial gaps larger, so as to locally form large by-pass passages. In such a case, a large amount of hot gas under transportation is brought into direct contact with the inner pipe, often causing hot spots which in turn cause cracks in the inner pipe.

It is considered that the by-pass passages of the gas, which are formed, as stated before, to include the clearances in the sliding joints and slits, have highly complicated shapes and patterns of communication. However, concerning the layer of lower temperature of the heat insulating structure, these by-pass passages can be sorted into the following three kinds of passages, namely passages A extending along the intermediate partition pipe, passages B formed axially at the center of the heat insulating materials and passages C formed along the sealed inner pipe.

The rate of increase of the thermal conductivity, i.e. the ratio of the thermal conductivity exhibited by the heat insulating structure after the by-pass passages are formed to the same thermal conductivity before the by-pass passages are formed, sharply increases as the temperature of the gas transported becomes higher and the positions of the by-pass passages become closer to the low temperature side. At the same time, the rate of increase of the thermal conductivity becomes larger, as the pressure of the transported gas increases, because the thermal conductivity of the gas itself is increased as the pressure becomes higher. In addition, needless to say, the rate of increase of the thermal conductivity becomes larger as the flow rate of the gas flowing through the by-pass passage becomes larger.

At page 23 of the Study of Machines, vol. 26, No. 10 (1974), it is suggested to fix the heat insulating material disposed in a pressure-resistant pipe, i.e. the sealed pipe, to the wall of the pressure resistant pipe, thereby to prevent the formation of the by-pass passages. This way of solution is however still insufficient because the restorability of the heat insulating material is gradually deteriorated, as stated before, due to the repeated generation of thermal stress attributable to the difference of the coefficients of thermal expansion between the pipe and the heat insulating material, so as to cause various gaps which soon grow to form by-pass passages.

As has been explained, in the conventional pipes for transporting the gases of high temperature and passure, the deterioration of the heat insulating performance of the heat insulating material attributable to the formation of by-pass passages is considerably large. This tendency becomes more serious as the temperature and/or the pressure become higher.

All other constructions containing therein a gas of high temperature and pressure and having a heat insulating construction suffer the same problem.

Thus, how to prevent the formation of gaps in the heat insulating material has become a key to the safe and efficient handling of the working gases in various plants, the pressure and temperature of which are becoming higher recently.

SUMMARY OF THE INVENTION

It is therefore an object of the invention to provide a heat insulating structure for use in handling and transportation of high temperature and pressure gas, having a heat insulating material disposed between a pipe and the gas flowing through the pipe and adapted to minimize the transfer of heat from the gas to the pipe, in which the formation of by-pass passages which would allow the direct contact of the gas with the pipe is effectively suppressed.

It is another object of the invention to provide a heat insulating structure for use in handling and transportation of high temperature and pressure gas, which is designed and constructed to avoid the formation of by-pass gas passages through the heat insulating material and through the annular clearance between the pipe wall and the heat insulating material.

It is still another object of the invention to provide a highly reliable heat insulating structure which is designed and constructed to avoid the formation of the by-pass gas passages through the heat insulating material and through the annular clearance between the pipe wall and the heat insulating material and, at the same time, to avoid the mingling of the heat insulating material with the gas flowing through the pipe.

To these ends, according to the invention, there is provided a heat insulating structure having a tubular cylindrical body through which a gas of high temperature and pressure passes, a tube made of a heat-resistant metallic material and disposed in the tubular cylindrical body, the tube defining a passage for the high temperature and pressure gas, a heat insulating material disposed between the tubular cylindrical body and the tube and adapted to prevent the heat possessed by the gas from being transferred to the outside, and resilient members adapted to always bias the heat insulating material in the radial direction.

DESCRIPTION OF THE PREFERRED EMBODIMENTS

A preferred embodiment of the invention will be described in detail hereinafter, with specific reference to FIGS. 1 and 2.

Figure 1:
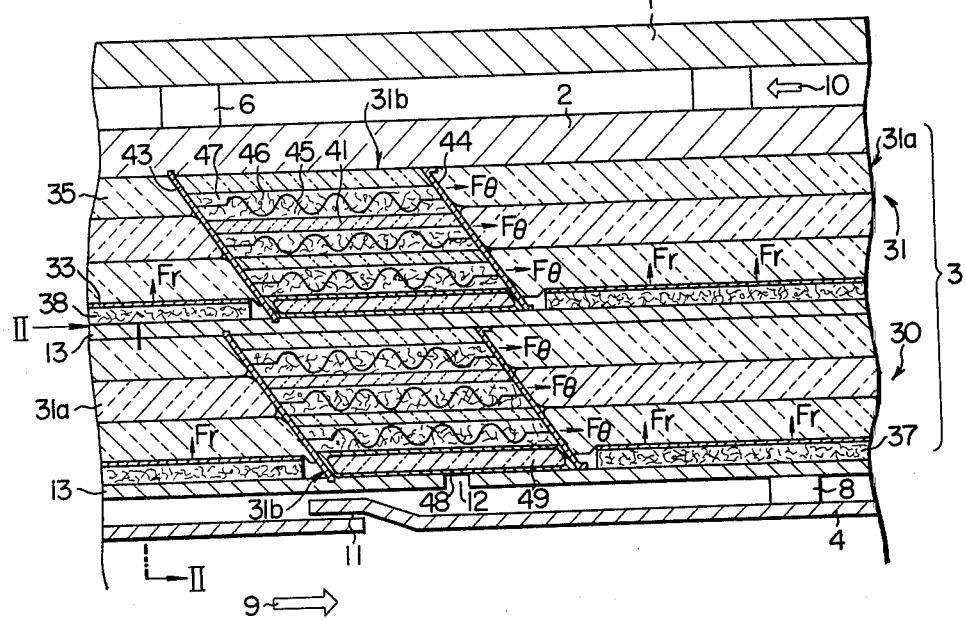
FIG. 1 is a sectional view of a heat insulating structure embodying the invention for use in handling and transportation of a high pressure and temperature gas.

Referring first to FIG. 1, an inner pipe 2 is disposed within an outer pipe 1, and is spaced from the latter by means of a plurality of spacers 6, so as to form an annular space 5 therebetween. A cooling gas is adapted to be circulated through this annular space 5, as denoted by an arrow 10. A dummy tube 4 made of a heat-resistant metallic material is disposed in the inner pipe 2 defines a passage for the working gas to be transported. Thus, the working gas flows in the passage formed by the dummy tube 4, in the direction of an arrow 9. This dummy tube consists of a plurality of longitudinal sections which are connected by slide joints . A heat insulating structure 3, which will be detailed later, is disposed between the dummy tube 4 and the inner pipe 2, so as to diminish the heat exchange between the transported working gas 9 and a cooling gas 10, and to minimize the temperature differential across the wall of the inner pipe 2.

The heat insulating structure 3 consists of a plurality of layers 30, 31. These layers are substantially equal in constructions but may have different sizes. Each layer 30, 31 includes shaped fibrous heat insulating material 31a and a fibrous heat insulating material 31b which are divided in the axial direction into a plurality of sections. The independent sections of these two kinds of heat insulating materials are arranged alternatingly in the axial direction, in each of the layers 30, 31. The heat insulating materials 31a, 31b are supported by intermediate partition pipes 13 which are divided in the axial direction into a plurality of sections and define, between the adjacent sections, slits 12. The intermediate partition pipe 13 for the layer 30 does not play the role of a partition for the gas but functions merely to define the passage for the gas and to support the heat insulating material.

Figure 2:
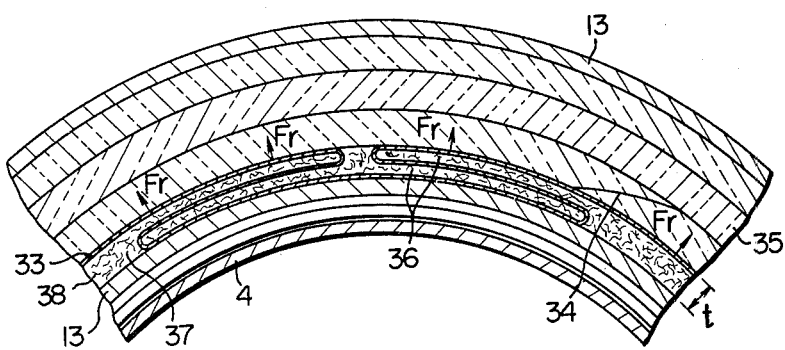
FIG. 2 is a cross-sectional view of the heat insulating structure taken along the line II—II of FIG. 1, FIGS. 3, 4 and 5 are sectional views of examples of resilient members incorporated in the heat insulating structure in accordance with the invention.

As shown in FIG. 2, the shaped fibrous heat insulating material 31a consists of laminated semi-shaped fibrous heat insulating materials 35 each of which having an annular cross-section and made discontinuous in the circumferential direction by the presence of at least one cut arcuate surface 34. Between the intermediate partition pipe 13 and the semi-shaped fibrous heat insulating materials 35, disposed is a spring member 33 having a cross-section continuous in the circumferential direction. The spring member 33 is adapted to exert a suitable force Fr, so as to always bias the semi-shaped fibrous heat insulating materials in the radial direction.

The space 36 formed by the spring member 33 itself and the space 37 formed between the spring member 33 and the intermediate partition pipe 13 are suitably filled with a bulky fibrous heat insulating material having good elasticity or an elastic heat insulating member 38 made of metallic fibrous heat insulating material.

On the other hand, the fibrous heat insulating material 31b is provided with a plurality of springs which tend to expand in the axial direction of the pipe disposed therein. In the illustrated embodiment, the circular springs 45 having a corrugated section in the axial direction are used. Around each of the circular springs 45, disposed is an elastic heat insulating member 47 consisting of a bulky fibrous heat insulating material 46. The bulky fibrous heat insulating material 46 has a large diameter of fiber and, therefore, a large elasticity, so as to exert an axial compression force $F_\theta$.

Between the adjacent elastic heat insulating members 47, i.e. at the inside and outside of each elastic heat insulating member 47, disposed are semi-shaped fibrous heat insulating materials 41.

The fibrous heat insulating material thus formed is disposed in the axial alignment with the slit 12 formed between the adjacent axial sections of the intermediate partition pipe 13. The innermost semi-shaped fibrous heat insulating material 41 which is in direct contact with the slit 12 is a metal-enclosed heat insulating material 49 which consists of the semi-shaped heat insulating material enclosed by a foil of a metal highly resistant to heat, e.g. nichrome or the like.

The fibrous heat insulating material 31b is fixed at its one end, against the axial movement, by an anchoring member 43 which in turn is rigidly fixed to the inner pipe 2 or to the intermediate partition pipe 13 by an insertion or welding. Meanwhile, the other end of the fibrous heat insulating material 31b is supported by a slidable supporting member 44 adapted to facilitate the axial expansion of the circular springs 45 or of the elastic heat insulating member 38.

In the double pipe construction for transportating a gas of high pressure and temperature, incorporating the heat insulating structure of this embodiment, the shaped fibrous heat insulating material 31a is always biased in the radial direction by the force Fr, while the fibrous heat insulating material 31b is always biased in the axial direction by the force $F_\theta$.

Thanks to these biasing forces, no gap is formed in the heat insulating structure, even if a force which would displace and deform the components of the structure is generated due to the difference in the coefficients of thermal expansion, so that the formation of the aforementioned by-pass passage is fairly avoided, so as to preserve the original heat insulating performance of the heat insulating structure 3. In other words, the heat insulating performance is remarkably improved. This remarkable improvement in the heat insulating performance is enhanced due to the fact that the formation of the by-pass passages at the low temperature side of the heat insulating structure, which would seriously affect the heat insulating performance, is avoided.

Further, since the shaped fibrous heat insulating material 31a has a laminated construction in which the semi-shaped fibrous heat insulating materials 35, each of which having an annular cross-section cut along the arcuate surface 34, the shaped fibrous heat insulating material 31a can be fabricated to have a size which is somewhat larger than that actually required to cover the cross-sectional length which is to be insulated by the semi-shaped fibrous heat insulating material 35. Consequently, the spring member 33 can have a larger effective compression stroke. In other words, the radial width or thickness of the shaped fibrous heat insulating material 35 which is controllable by the radial force Fr exerted by the spring member 33 is much increased. At the same time, the sliding movement of the shaped fibrous heat insulating material 31a is smoothened. Further, the sliding movement of the spring member 33 itself is smoothened, because the space 36 formed by the spring member 33 itself and the space 37 formed between the spring member 33 and the intermediate partition pipe 13 are conveniently filled with a heat insulating material having a good elasticity or with elastic heat insulating member 38 consisting of a metallic fibrous heat insulating material. The above mentioned heat insulating material having a good elasticity or the elastic heat insulating member 38 is effective also in improving the heat insulating performance.

Assuming that a by-pass passage is formed along the gap or space between the spring member 33 and the intermediate partition pipe 13, the gas flowing through this by-pass passage will invade the semi-shaped fibrous heat insulating material 35, resulting in not only the deterioration of the heat insulating performance but also in a breakage of the semi-shaped fibrous heat insulating material 35, if the spring member 33 has a discontinuity in the circumferential direction. However, according to the invention, no invasion of the semi-shaped fibrous heat insulating material 35 takes place, even when the above-mentioned by-pass passage is happened to be formed, because the spring member 33 has a circumferentially continuous cross-section having no gap which would form a radial passage of the gas. This advantageous effect is more remarkable with the radial width of the spaces 36, 37 filled with the elastic heat insulating member 38, and if the radial height t of the spring member 33 is small, therefore, it is preferred to make the radial height t small.

Further, in this embodiment, the metal enclosed fibrous heat insulating material 49 is disposed adjacent to the slit 12 formed between the adjacent sections of the intermediate partition wall 13. At the same time, an axial compression force $F_\theta$ is formed by the spring member 45 having a corrugated cross-sectional shape and the elastic heat insulating member 47. Therefore, the radially-extending gap, which would otherwise be formed locally due to the displacement of the adjacent heat insulating materials 35 or due to an uneven density distribution and irregularity of the cross-sectional shape of the heat insulating material which are practically unavoidable, is not formed, thanks to the presence of the axial compression force $F_\theta$. Consequently, the apparent thermal conductivity of the semi-shaped fibrous heat insulating material is maintained sufficiently small, so as to preserve the original good heat insulating performance. In addition, the invasion of the semi-shaped heat insulating material 35 by the hot gas and, accordingly, the breakage of the heat insulating material by the hot gas are fairly avoided.

Further, since the portion of the heat insulating material held in direct contact with the slit 12 is constituted by a metal-enclosed heat insulating material 49 enclosed by a heat resistant metal foil, it can hardly take place that the fibers of the heat insulating material are carried away by the gas to contaminate the latter. This feature is quite advantageous from the view point of safety and reliability of the operation of plant.

In the described embodiment, the dummy tube 4 is made of hastelloy, while spring members 33, 45 are made of nichrome or the like.

Figure 3:
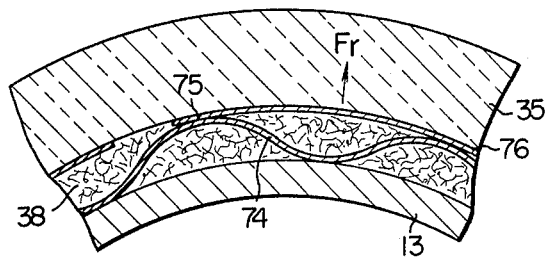
Figure 5:
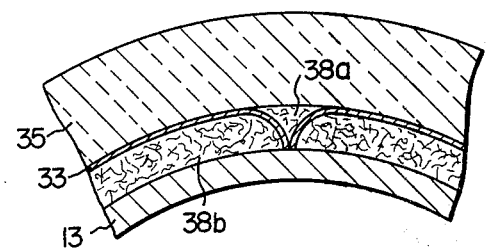
Figure 4:
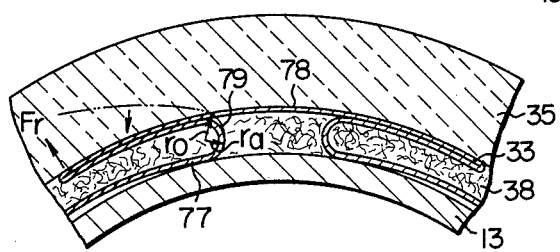

FIGS. 3, 4 and 5 show different forms of the spring member 33 used in the described embodiment. As has been stated, the spring member 33 has to have a circumferentially continuous cross-section and preferably has a small radial width or thickness of the space to be filled with the elastic heat insulating material 38, i.e. a small radial height t. Further, the spring member 33 has to exhibit a large restorability, so that it may effectively compensate for the degradation of the restorability of the heat insulating member 35, thereby to prevent the gap from growing as the time elapses, even if such a gap is happened to be formed.

In each of the arrangements as shown in FIGS. 3, 4 and 5, the space outside of the intermediate partition pipe 13 is filled with the elastic heat insulating member 38 which in turn is surrounded by the semi-shaped fibrous heat insulating material 35. Referring first to FIG. 3, the spring member 33 consists of a spring force adjusting plate 74 consisting of a currugated plate curved to have a circular form and disposed in the layer of the elastic heat insulating material 38, and a protecting plate 76 adapted to protect the heat insulating material. The protecting plate 76 has a circular cross section and overlies a part 75 of the apices of the spring force adjusting plate 74, so as to extend along the inner peripheral surface of the heat insulating material 35. The spring force adjusting plate 74 and the associated protecting plate 76 when considered together are made continuous in the circumferential direction. This form of the spring member 33 can be produced easily, because the corrugation of the spring member can be simply formed by means of a press or the like. In addition, the spring force Fr can be distributed uniformly over the entire circumference, by increasing the number N of the crests and valleys of the corrugation.

The example of the spring member 33 as shown in FIG. 4 consists of a circumferentially continuous plate member which has a plurality of inner sections 77 extending along the outer peripheral surface of the intermediate partition pipe 13, a plurality of outer sections 78 each of which including a first layer and a second layer which are extending in opposite circumferential directions along the inner peripheral surface of the semi-shaped fibrous heat insulating material 35, and a plurality of spring force adjusting sections 79 by means of which the inner and outer sections 77, 78 are interconnected. Thus, the spring force Fr is imparted by the spring force adjusting section 79 having a radius of curvature ra. Thus, an extremely large spring force Fr can be obtained by making the spring force adjusting section 79 have a large free radius of curvature roa, i.e. a large radius of curvature in the free state before the installation. Consequently, a large effective radial compression stroke of the spring member, i.e. a large radial width of restorability can be obtained.

In the example as shown in FIG. 5, most of the spring member 33 is in contact with the semi-shaped fibrous heat insulating material 35. The spring member 33 is partially projected inwardly at its several portions toward the outer peripheral surface of the intermediate partition pipe 13. This arrangement advantageously affords an easy insertion of the heat insulating member 38, because of a simple cross-sectional shape of the space between the spring member 33 and the intermediate partition pipe 13.

In addition, since the amount of the elastic heat insulating member 38a disposed between the heat insulating material 35 and the spring member 33 is much smaller than that of the elastic heat insulating material 38b disposed between the spring member 33 and the intermediate partition pipe 13, the semi-shaped fibrous heat insulating material 35 suffers substantially no adverse effect even if small gaps are formed in the heat insulating member 38 disposed in the space, due to a radially outward restoration of the spring member 33. Consequently, this arrangement allows a use of a spring member 33 having a large restorability.

Figure 6:
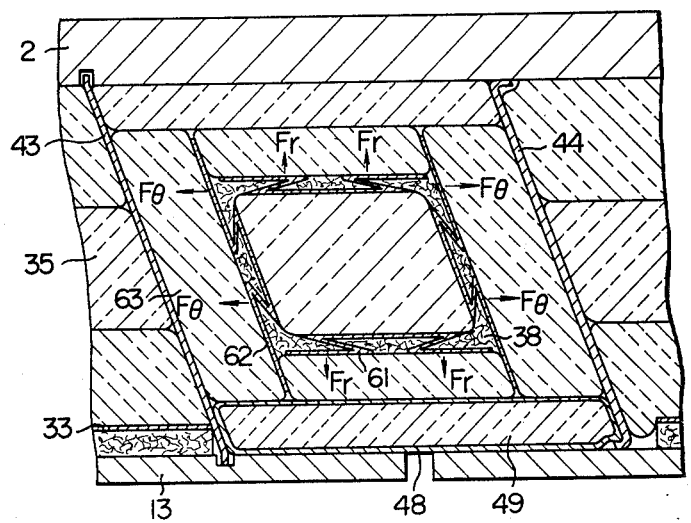
FIG. 6 is a sectional view of heat insulating structure, which is another embodiment of the invention, for use in handling and transportation of a high temperature and pressure gas.

FIG. 6 shows a heat insulating structure of another embodiment of the invention having a different arrangement of the fibrous heat insulating material. This embodiment has a construction of the semi-shaped fibrous heat insulating material 35 substantially the same as that of the first embodiment.

As will be seen from FIG. 6, the fibrous heat insulating structure of this embodiment has spring members 61, 62 which are adapted to exert radial and axial compression forces Fr and F$_\theta$. The spring members 61, 62 are surrounded by elastic fibrous heat insulating material 38 having a larger diameter of fiber and, accordingly, larger elasticity than the ordinary fibrous heat insulating material. At the same time, the inside and outside spaces are filled separately with a semi-shaped fibrous heat insulating material 63. These constituents are shaped as a unit.

Meanwhile, a metal-enveloped heat insulating material 49, enveloped by a metal foil 48, is disposed on the slit 12 formed between the longitudinal sections of the intermediate partition pipe 13. An anchoring member and a slidable supporting member, which are denoted by reference numerals 43, 44, have functions materially identical to those in the first embodiment.

According to the fibrous heat insulating structure of this embodiment, biasing forces are exerted by the spring members 61 not only in the axial direction but in the radial direction as well, so as to effectively suppress the formation of the internal gaps. The heat insulating performance is further improved by using this fibrous heat insulating material in combination with the aforesaid shaped fibrous heat insulating material.

In the foregoing description of the embodiments, biasing or compression forces are exerted by the spring members in both of the axial and radial directions. However, it is not always necessary to prevent the formation of gaps in both of radial and axial directions.

Namely, once the by-pass passage is formed, the flow of the high temperature gas along the axially extending passage affects the heat insulating material more seriously than the radial flow. From this point of view, it is essential to prevent the formation of the axially-extending by-pass passage, i.e. to prevent the formation of the radial gaps or clearances.

Although the invention has been described with specific reference to the double pipe construction for transporting a high temperature and pressure gas, this is not exclusive, and the heat insulating construction of the invention can be used, needless to say, broadly for various purposes which would require an insulation of heat possessed by the high temperature and pressure gas.

As has been described, according to the invention, there is provided a heat insulating structure for use in connection with a high temperature and pressure gas, comprising a tubular cylindrical body accommodating a gas having a high temperature and pressure, a tube made of a heat-resistant metallic material and disposed in the tubular cylindrical body so as to define a passage for the gas of high temperature and pressure, a heat insulating material disposed between the tubular body and the tube and adapted to prevent the heat possessed by the gas from leaking outside, and an elastic member disposed in the heat insulating material so as to always bias the latter in the radial direction. Thus, according to the invention, the formation of internal gaps, attributable to the relative movements of the heat insulating materials due to the difference in the coefficients of thermal expansion, is fairly avoided thanks to the radial biasing force.

Consequently, the by-pass passages which would cause the deterioration of the heat insulating performance are never formed in the heat insulating structure, so that the original heat insulating performance of the heat insulating structure is preserved over a long time of use.

The heat insulating structure of the invention therefore exhibits a distinguished heat insulating performance when used in transportation and handling of gases having a high temperature and pressure.

What is claimed is:

1. A heat insulating structure for preventing the heat possessed by a high temperature and pressure gas in a tubular cylindrical body from leaking outside, characterized by comprising a tube made of a heat-resistant metallic material and disposed in said tubular cylindrical body so as to define a passage for said gas, a heat insulating material disposed between said tubular cylindrical body and said tube, an elastic member disposed in said heat insulating material and adapted to always bias said heat insulating material toward said tubular cylindrical body, and said elastic member being an axially extending and circumferentially continuous spring so that the gas is prevented from flowing from the inside of said tube into said heat insulating material.

2. A heat insulating structure for preventing the heat possessed by a high temperature and pressure gas in a tubular cylindrical body from leaking outside, characterized by comprising a tube made of a heat-resistant metallic material and disposed in said tubular cylindrical body so as to define a passage for said gas, a heat insulating material disposed between said tubular cylindrical body and said tube, an elastic member disposed in said heat-insulating material and adapted to always bias said heat-insulating material toward said tubular cylindrical body, said tube being divided in the axial direction into a plurality of axial sections, so that a plurality of slits for allowing said gas to pass therethrough are formed between pairs of adjacent axial sections, said heat insulating materials consisting of a plurality of fibrous heat insulating materials and a plurality of shaped fibrous heat insulating materials, said fibrous heat insulating materials and said shaped fibrous heat insulating materials being arranged alternatingly and independently, said fibrous heat insulating materials being disposed in the space between said tubular cylindrical body and said tube, while said shaped fibrous heat insulating material being biased toward said tubular cylindrical body by said elastic member.

3. A heat insulating structure as set forth in claim 2, wherein said heat insulating material is divided in the radial direction in at least a portion thereof so as to have a plurality of layers, each of said layers including at least one tube, said tube being divided in the axial direction into a plurality of axial sections so as to form a plurality of slits between pairs of adjacent axial sections, said fibrous heat insulating material being disposed in axial alignment with said slits.

4. A heat insulating structure as set forth in claim 2, wherein said shaped fibrous heat insulating material has a tubular form consisting of a plurality of layers, each of said layers having an arcuate cut surface which extends in the axial direction, whereby layers of the tubular shaped fibrous heat insulating material are cut at the arcuate surfaces.

5. A heat insulating structure as claimed in claim 2, characterized by further comprising an elastic member adapted to compress said heat insulating member in the axial direction.

6. A heat insulating structure as claimed in claim 5, wherein said elastic member for compressing said heat insulating material in the axial direction is a corrugated circular spring expandable and shrinkable in the axial direction, and is disposed in said fibrous heat insulating material.

7. A heat insulating structure as set forth in claim 6, wherein the space around said corrugated circular spring is filled with a bulky fibrous heat insulating material.

8. A heat insulating structure as set forth in claim 7, wherein said heat insulating material is divided in the radial direction by at least one intermediate partition pipe, said intermediate partition pipe being divided into a plurality of axial sections so as to form a plurality of slits between the successive axial sections, each of said slits being overlain by a fibrous heat insulating material enveloped by a metallic foil.

9. A heat insulating structure as set forth in claim 8, wherein said fibrous heat insulating material is fixed at its one axial end by an anchoring member and at its other axial end by an axially slidable member.

10. A heat insulating structure for preventing the heat possessed by a high temperature and pressure gas in a tubular cylindrical body from leaking outside, characterized by comprising a tube made of a heat-resistant material and disposed in said tubular cylindrical body so as to define a passage for said gas, a heat insulating material disposed between said tube and said tubular cylindrical body, and elastic means adapted to bias said heat insulating material in both of axial and radial directions, said elastic means being formed to be continuous in the circumferential direction, thereby to prevent the gas from passing therethrough.

11. A heat insulating structure as set forth in claim 10, wherein said elastic means comprises a plurality of springs.

* * * * *